United States Patent
Spatafora

(10) Patent No.: US 6,213,284 B1
(45) Date of Patent: Apr. 10, 2001

(54) METHOD AND UNIT FOR TRANSFERRING ARTICLES

(75) Inventor: Mario Spatafora, Bologna (IT)

(73) Assignee: G.D Societa' per Azioni, Bologna (IT)

( * ) Notice: Subject to any disclaimer, the term of this patent is extended or adjusted under 35 U.S.C. 154(b) by 0 days.

(21) Appl. No.: 09/236,940

(22) Filed: Jan. 25, 1999

(30) Foreign Application Priority Data

Jan. 27, 1998 (IT) .............................................. BO98A0025

(51) Int. Cl.[7] ............................ B65G 32/00; B65G 43/00
(52) U.S. Cl. .................................... 198/463.2; 198/631.1; 198/418
(58) Field of Search ................................ 198/463.2, 631.1, 198/418, 803.1–803.8; 271/277, 204, 182, 183

(56) References Cited

U.S. PATENT DOCUMENTS

| | | | |
|---|---|---|---|
| 4,004,395 | * | 1/1977 | Bardenhagent et al. ................ 53/396 |
| 4,217,979 | * | 8/1980 | Bald et al. .......................... 198/418.3 |
| 4,503,967 | * | 3/1985 | Erdmann et al. .................. 198/418.3 |
| 4,526,268 | * | 7/1985 | Hoffmann et al. ................ 198/418.3 |
| 4,764,078 | * | 8/1988 | Neri . |
| 4,804,079 | * | 2/1989 | Hensgen et al. ...................... 198/450 |
| 4,827,948 | * | 5/1989 | Schumacher .......................... 131/282 |
| 5,209,247 | * | 5/1993 | Rittershaus et al. .................... 131/58 |
| 5,220,992 | * | 6/1993 | Milins .................................. 198/418 |
| 5,411,039 | * | 5/1995 | Sakuma et al. ........................ 131/330 |
| 5,426,921 | * | 6/1995 | Beckmann ............................... 53/566 |
| 5,564,556 | * | 10/1996 | Spada et al. ..................... 198/803.13 |
| 5,630,309 | * | 5/1997 | Blidung et al. ......................... 53/443 |
| 5,743,067 | * | 4/1998 | Trimani .................................. 53/151 |
| 5,860,506 | * | 1/1999 | Bailey et al. ..................... 198/471.1 |
| 5,996,310 | * | 12/1999 | Bailey et al. .......................... 53/228 |

FOREIGN PATENT DOCUMENTS

| | | | |
|---|---|---|---|
| 2938613A1 | * | 9/1979 | (DE) . |
| 3519580C1 | * | 5/1985 | (DE) . |
| 3627670C1 | * | 8/1986 | (DE) . |
| 2290514 | | 1/1996 | (GB) . |
| 8-301247 | * | 11/1996 | (JP) . |
| 9521771 | | 8/1995 | (WO) . |

\* cited by examiner

*Primary Examiner*—Christopher P. Ellis
*Assistant Examiner*—Kenneta W. Bower
(74) *Attorney, Agent, or Firm*—Ladas & Parry

(57) ABSTRACT

A method and unit for transferring articles between a first seat in a given position, and a second seat traveling along a first path, whereby at least one pickup member for picking up the articles is fed along a second path extending between the first seat and the first path; the articles are transferred between the second seat and the pickup member at a point of tangency between the first path and the second path; and the articles are transferred between the first seat and the pickup member as the pickup member travels along a substantially straight portion of the second path, parallel to an input/output direction of the articles with respect to the first seat.

29 Claims, 7 Drawing Sheets

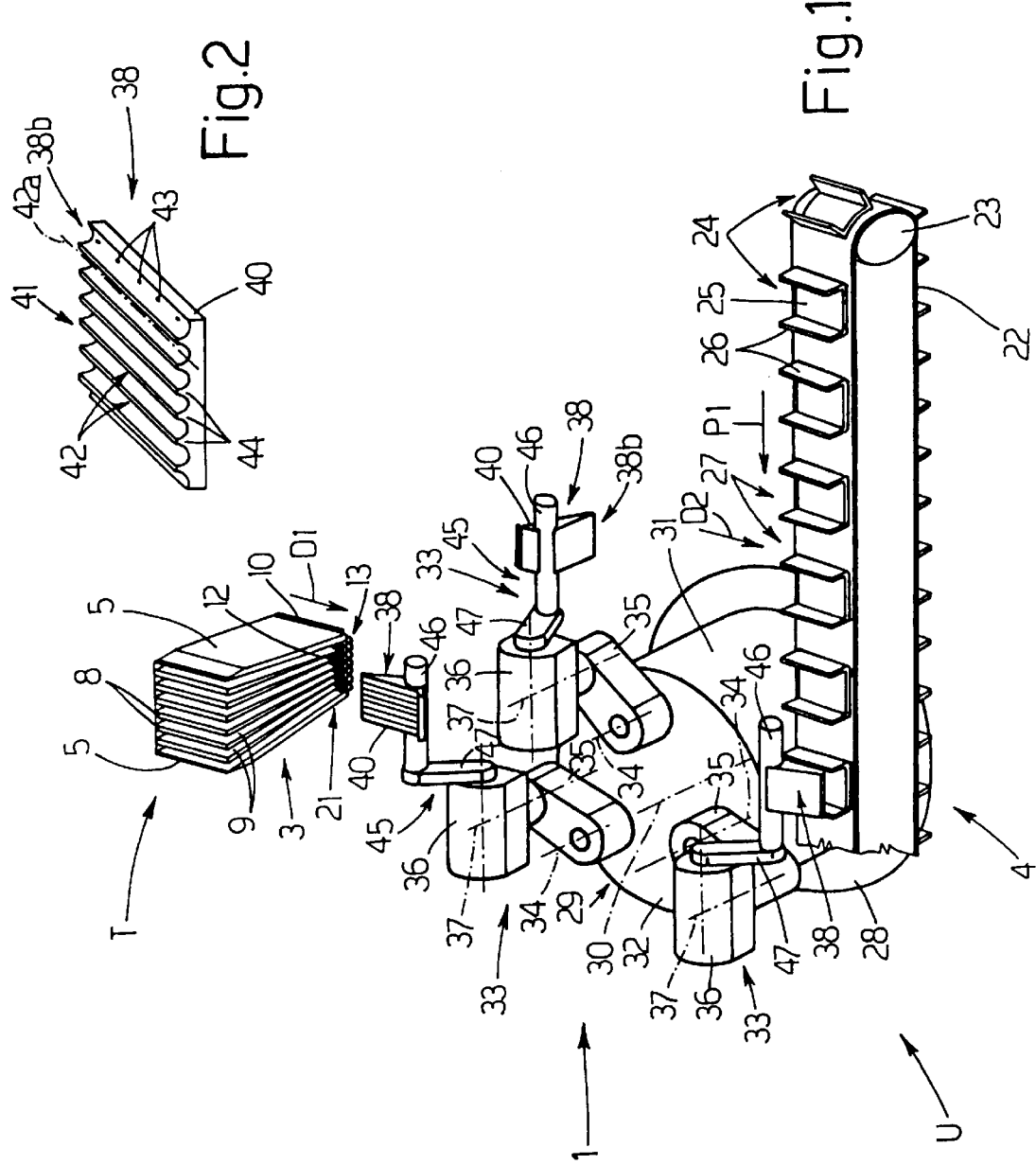

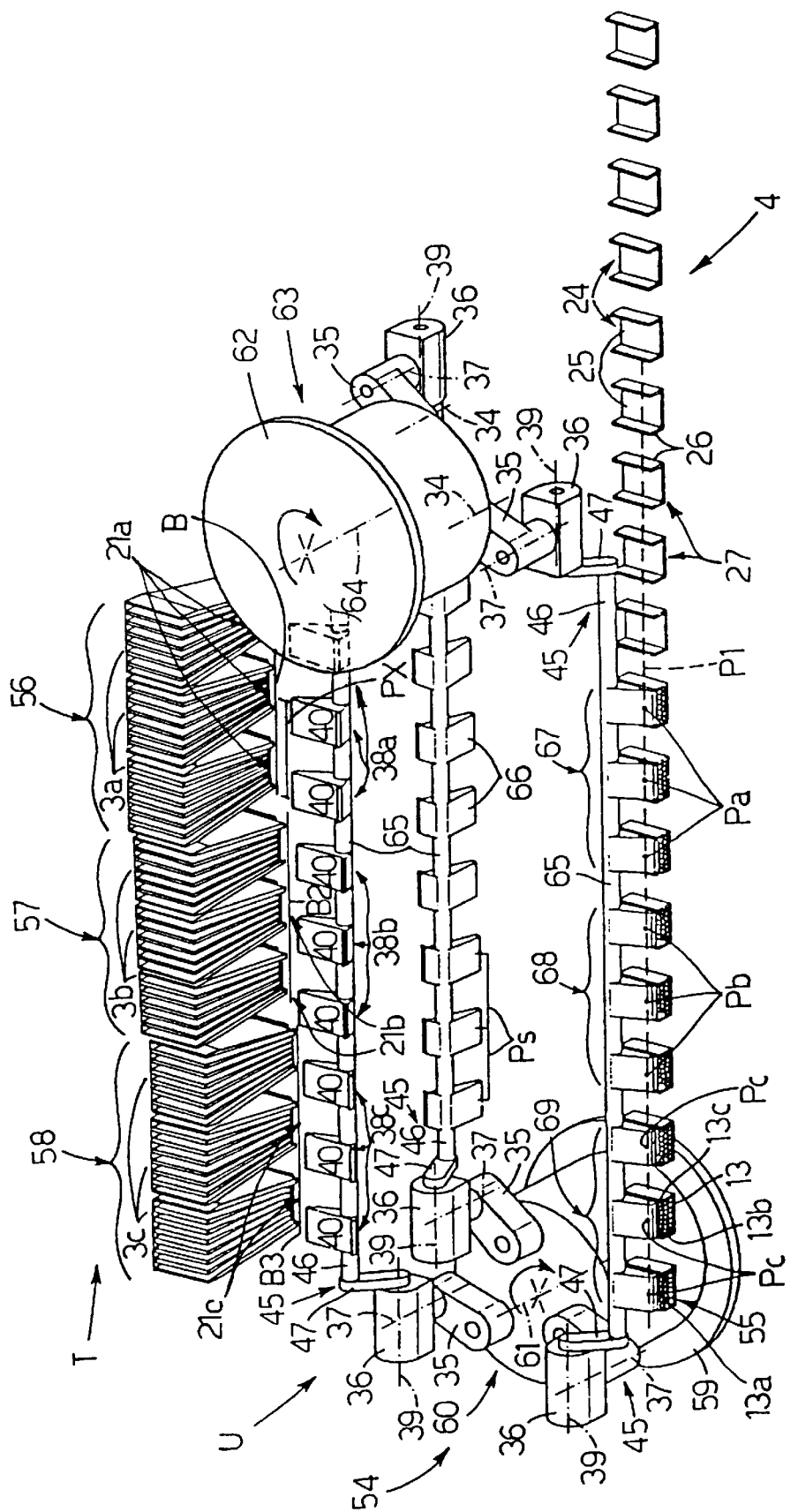

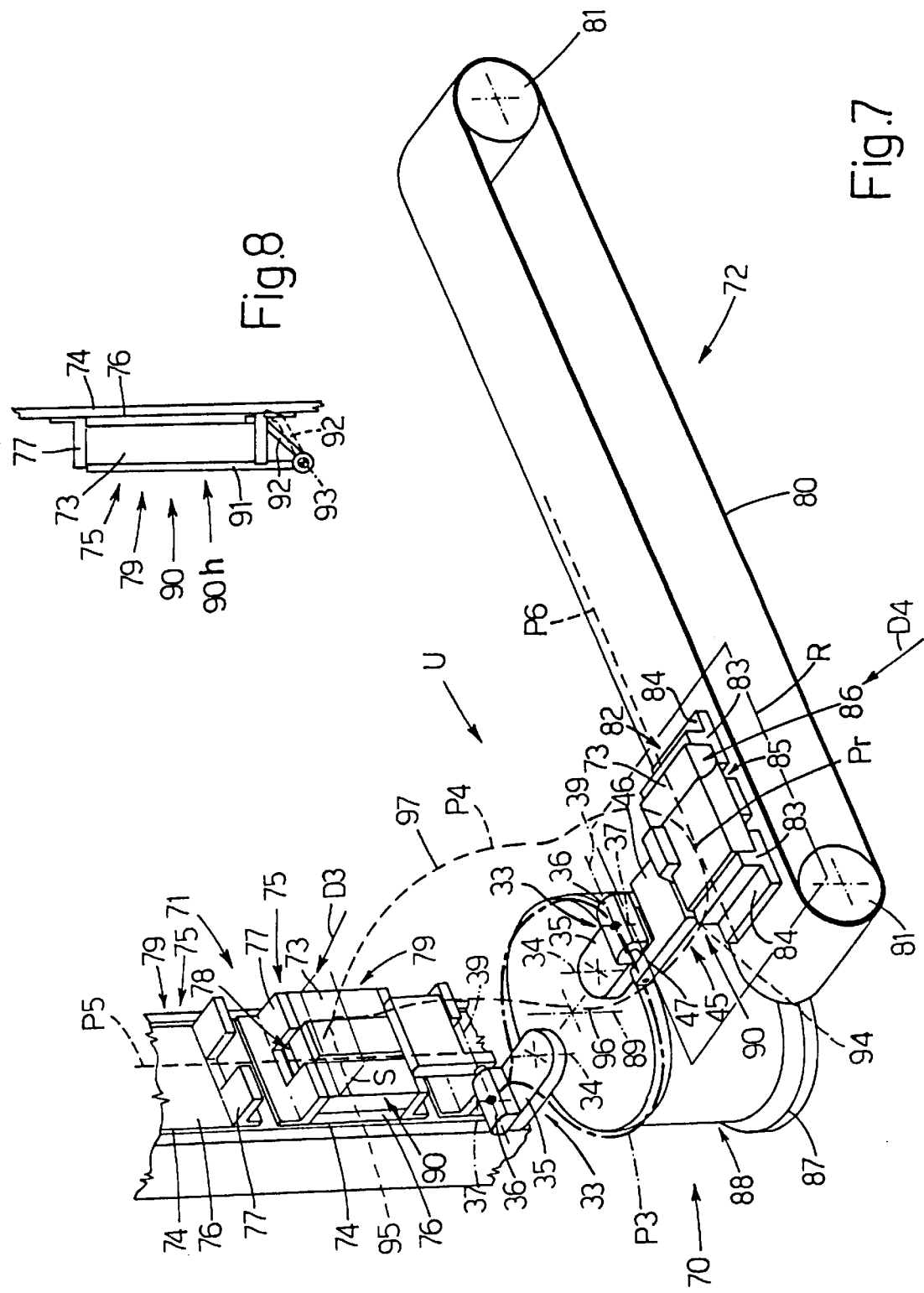

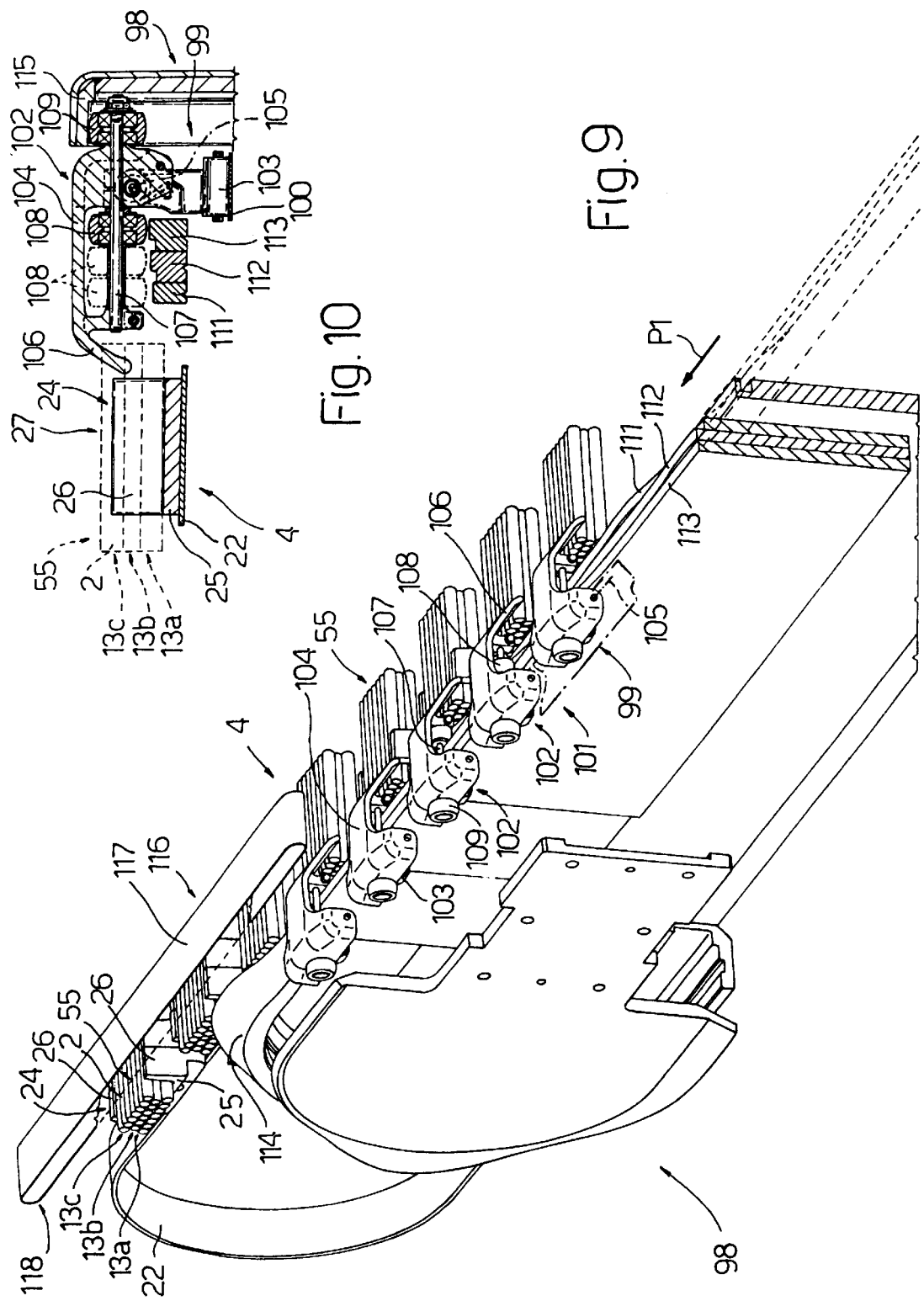

METHOD AND UNIT FOR TRANSFERRING ARTICLES

BACKGROUND OF THE INVENTION

The present invention relates to a method of transferring articles.

In particular, the present invention relates to a method of transferring tobacco articles, such as cigarettes or packets of cigarettes, to which the following description refers purely by way of example.

In the tobacco industry, packets of cigarettes are known to be produced by forming groups of cigarettes, each defined by at least one layer of cigarettes; packing the groups in packing material to form the packets; sealing the packing material with an adhesive substance; and drying the adhesive substance to stabilize the packets.

Currently used systems for implementing the above method comprise one or more step-operated packing machines, i.e. of the type in which the cigarettes, fed in bulk to an input hopper of the packing machine, are withdrawn from the hopper and fed in groups of normally twenty cigarettes to a step-operated conveyor. The conveyor normally comprises a succession of pockets, which, as the conveyor moves forward in steps, are arrested successively at a loading station in front of the hopper to receive respective groups of cigarettes. Once formed and transferred onto the conveyor, the groups of cigarettes are transferred into seats on further conveyors defining a manipulating and packing path along which the groups are fed in steps to undergo said packing, sealing and drying operations.

Though extremely efficient and reliable, step-operated packing machines of the above type, like any step-operated mechanism, obviously have drawbacks: on the one hand, severe vibration, high noise level, and relatively high maintenance cost, mainly on account of the extremely high speed at which they are operated; and on the other, the fact that the speed of the conveyors can only be increased up to a given maximum limit.

To overcome the above drawbacks, and in view of the constant demand to increase the output of such conditioning machines, the current tendency is to produce machines in which all the conveyors operate continuously, to overcome the speed limit typical of step-operated conveyors.

Contrary to the above tendency, however, some operations, such as forming the layers or groups of cigarettes and drying the packets of cigarettes, would appear to be best performed in steps, which therefore means transferring cigarettes or a packet between a seat occupying a given position—in particular, a plate at the output station of a hopper, or a stationary seat on a step-operated conveyor— and a moving seat—in particular a seat on a continuously-moving conveyor.

This is the problem dealt with in European Patent No. 210,544, which relates to a chain transfer conveyor comprising a succession of pockets equally spaced along a chain, which, by virtue of a compensating system of movable pulleys, has a continuously-moving branch and a step-operated branch enabling groups of cigarettes to be transferred from the outlets of a hopper to a continuously-moving conveyor. The groups of cigarettes are transferred from the hopper outlets to stationary pockets along the step-operated branch, and from the pockets along the continuously-moving branch to the continuously-moving conveyor. The pockets on the conveyor must be arrested long enough to enable the cigarettes to be withdrawn from the hopper and inserted inside the pockets, which operations, though performed rapidly, call for the use of a step-operated pusher, the operating speed of which is limited, not only for mechanical reasons, but also to prevent subjecting the cigarettes to acceleration over and above a given limit.

The method proposed in the above patent fails to provide a satisfactory solution, by being based on the principle of arresting one branch of the transfer conveyor for as long as it takes to transfer groups of cigarettes from the hopper outlets to the respective pockets. As a result, the maximum speed of the transfer conveyor is no different from that of an ordinary step-operated conveyor, which limitation necessarily also affects the continuously-moving conveyors connected to it.

SUMMARY OF THE INVENTION

It is an object of the present invention to provide a method of transferring articles between a seat occupying a given position and a moving seat, and which provides for eliminating the aforementioned drawbacks, while at the same time ensuring smooth, precise transfer of the articles.

According to the present invention, there is provided a method of transferring articles between a first seat and a second seat, the first seat being located in a given position and being so formed as to define at least one input/output direction of said articles, and the second seat traveling along a given first path; the method comprising the steps of feeding at least one pickup member, for picking up said articles, along a second path extending between the first seat and the first path, said second path being substantially tangent to the first path; and transferring said articles between the second seat and the pickup member as the pickup member is fed along a first portion of the second path; said method being characterized in that said articles are transferred between the first seat and the pickup member as said pickup member is fed along a substantially straight second portion of the second path, parallel to said input/output direction of the articles with respect to said first seat.

The present invention also relates to a unit for transferring articles.

According to the present invention, there is provided a unit for transferring articles, the unit comprising a first seat and a second seat, the first seat being located in a given position and being so formed as to define at least one input/output displacement direction of said articles with respect to the first seat, and the second seat traveling along a given first path; a pickup device in turn comprising a pickup member for picking up said articles and traveling along a second path comprising a first portion tangent to the first path, and a second portion extending at said first seat; and actuating means for feeding said pickup member along said first portion and keeping the pickup member parallel to, and in time with, said second seat as the pickup member travels along the first portion, to transfer said articles between the second seat and the pickup member; the unit being characterized in that said second portion of said second path is a substantially straight portion extending parallel to said displacement direction.

BRIEF DESCRIPTION OF THE DRAWINGS

A non-limiting embodiment of the present invention will be described by way of example with reference to the accompanying drawings, in which:

FIG. 1 shows a view in perspective, with parts removed for clarity, of a first preferred embodiment of the transfer unit according to the present invention;

FIG. 2 shows a view in perspective of a detail of the FIG. 1 unit;

FIG. 6 shows a view in perspective, with parts removed for clarity, of a second preferred embodiment of the unit according to the present invention;

FIG. 7 shows a view in perspective, with parts removed for clarity, of a variation of the FIG. 1 unit;

FIG. 8 shows a lateral elevational view of a detail in FIG. 7;

FIG. 9 shows a view in perspective of a device associated with the FIG. 1 unit;

FIG. 10 shows a front view partially in section of a detail in FIG. 9.

DETAILED DESCRIPTION OF THE INVENTION

Figure 5:
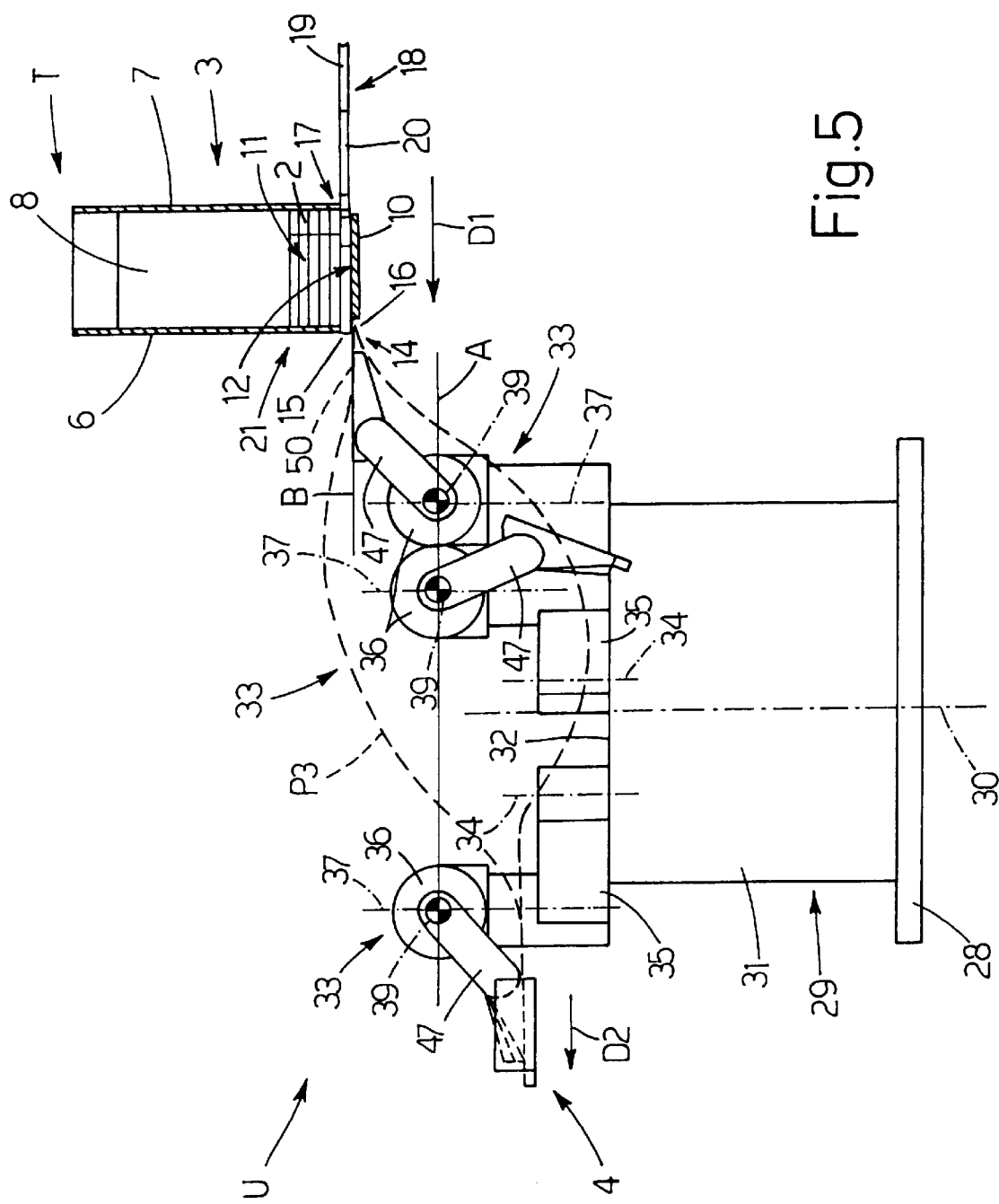
FIG. 5 shows a side view of the FIG. 1 unit.

In FIGS. 1 and 5, number 1 indicates a transfer device for transferring cigarettes 2 between an input hopper T having at least one outlet 3, and a continuously-moving output conveyor 4. Hopper T, transfer device 1 and output conveyor 4 together define a transfer unit U for transferring cigarettes 2.

Outlet 3, as shown in FIGS. 1 and 5, comprises two lateral walls 5; a front wall 6 facing device 1; a rear wall 7 parallel to and on the opposite side to wall 6; six partitions 8 crosswise to walls 6 and 7 and which, together with walls 5, define seven substantially vertical channels 9; and a substantially horizontal supporting plate 10 extending between the bottom ends of walls 5. Channels 9 contain respective columns 11 of cigarettes 2; plate 10 defines a surface 12 for supporting the bottom cigarette 2 in each column 11; and the cigarettes 2 resting directly on plate 10 form a layer 13 of cigarettes, which is transferred by device 1 from output 3 to conveyor 4. Outlet 3 also comprises an opening 14 extending between the bottom end of wall 6 and plate 10, and having a portion 15 coplanar with wall 6, and a portion 16 coplanar with plate 10; and a rear opening 17 extending between the bottom end of wall 7 and plate 10.

Outlet 3 is connected to a pusher 18, which is located opposite opening 17, and comprises a rod 19 connected to a number of fingers 20 (only one of which is visible in FIG. 5) equal to the number of channels 9, and moves back and forth between a rest position in which fingers 20 are located outside outlet 3, and a work position in which fingers 20 are positioned through opening 17, inside respective channels 9, and directly over plate 10 to push layer 13 through opening 14 and off supporting surface 12 of plate 10.

Supporting surface 12 of plate 10, the bottom ends of walls 5 and partitions 8, and openings 14 and 17 therefore define a receiving space or seat 21 for successively receiving layers 13, which are extracted through opening 14 by sliding along surface 12 in a direction D1 parallel to surface 12, walls 5 and partitions 8. The form of seat 21 therefore determines the orientation of direction D1 of cigarettes 2 from seat 21.

Conveyor 4 comprises a belt 22 looped about two pulleys 23 (only one shown in FIG. 1); and a number of pockets 24 equally spaced along belt 22 and traveling continuously along a straight path P1. Each pocket 24 comprises a bottom wall 25, and two parallel lateral walls 26 extending perpendicularly from bottom wall 25 to define a seat 27 for receiving layers 13. Being defined by only three walls 25, 26, each seat 27 has a number of input directions in which to feed layers 13 inside seat 27, one of which input directions—parallel to walls 25, 26 of pocket 24—is indicated D2 in FIG. 1.

Device 1 comprises a platform 28 on which is mounted a drum 29 rotating, with respect to platform 28, about an axis 30 crosswise to surface 12. Drum 29 comprises a cylindrical lateral wall 31 and a circular wall 32, both coaxial with axis 30; and wall 32 is fitted with three articulated arms 33 rotatable about respective axes 34 parallel to and equally spaced about axis 30. Each articulated arm 33 comprises a crank 35 rotating about a respective axis 34; a head 36 fitted in rotary manner to a free end of crank 35 to rotate, with respect to crank 35, about an axis 37 parallel to axis 30; and a pickup member 38 for picking up layers 13, and which is connected in rotary manner to head 36 to rotate, with respect to head 36, about an axis 39 crosswise to axis 30.

Figure 4:
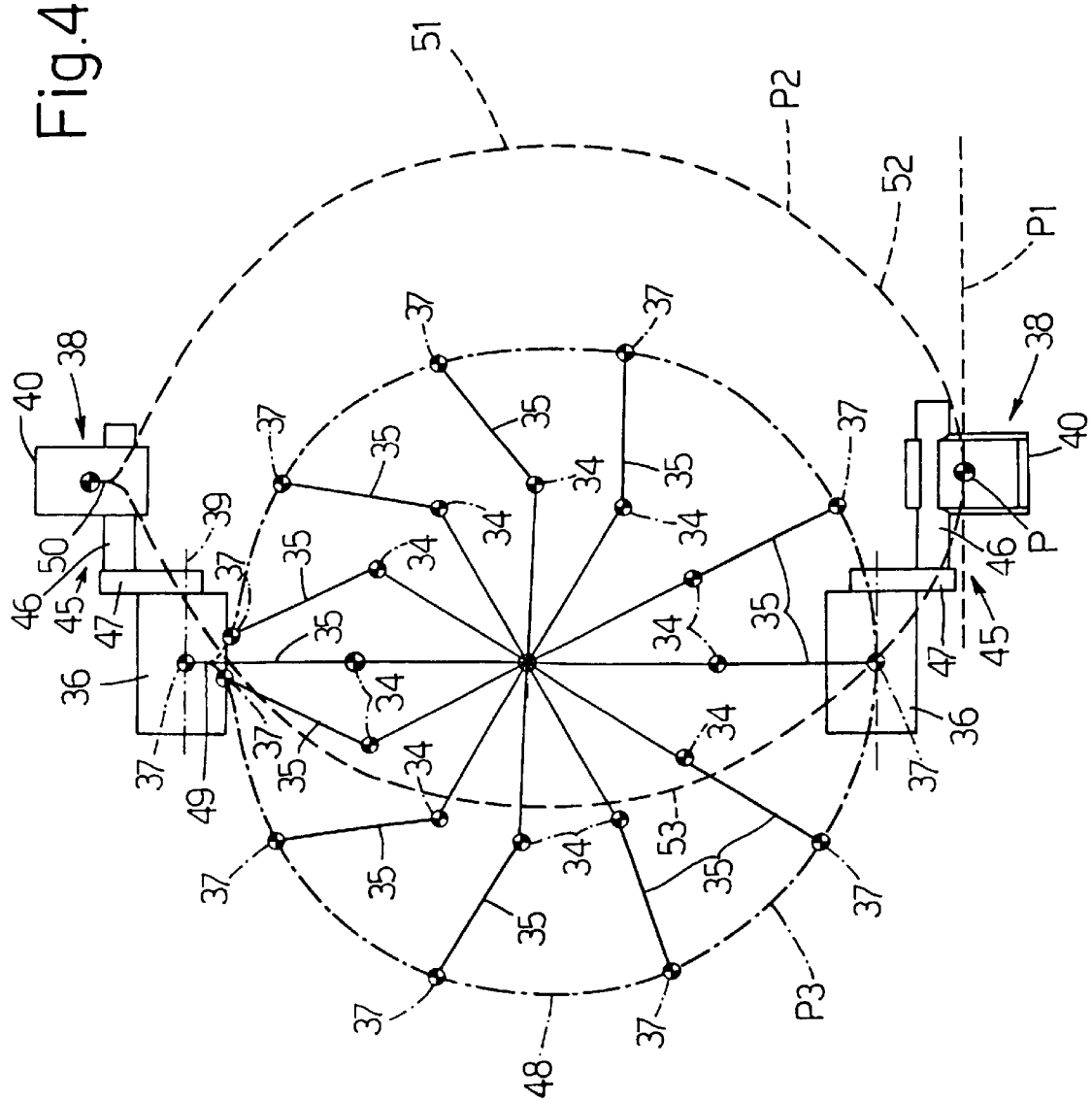
FIG. 4 shows a schematic view of a mechanism of the FIG. 1 unit.

As shown in FIG. 4, pickup member 38 travels along a path P2 extending between seat 21 and path P1 and tangent to path P1 at a given point P, and comprises a plate 40 having, as shown in FIG. 2, a face 41 in which are formed a number of parallel elongated seats 42 for housing respective cigarettes 2 of a layer 13. Each seat 42 has a number of suction holes 43 located along a longitudinal axis 42a of seat 42 to retain respective cigarette 2 inside seat 42, and is separated from an adjacent seat 42 by a rib 44. Pickup member 38 also comprises an end 38b located at an input/output station of cigarettes 2, which, through end 38b, slide along seats 42 in the direction of axes 42a of seats 42.

Pickup member 38 is connected to head 36 by a right-angle crank 45, which comprises a portion 46 integral with plate 40 and extending parallel to axis 39; and a portion 47 perpendicular to portion 46, and the free end of which is connected to head 36 to rotate, with respect to head 36, about axis 39.

In actual use, cigarettes 2 are housed inside outlet 3 in columns 11 inside respective channels 9, with the bottom cigarette 2 of each column 11 resting on plate 10. Pusher 18 is moved back and forth cyclically between the rest and work positions to extract from seat 21, at each cycle, a layer 13 of cigarettes 2 resting on plate 10; and, at each cycle, columns 11 advance one step, equal to the diameter of a cigarette 2, to feed another layer 13 onto plate 10. At the same time, seats 27 of conveyor 4 are fed continuously and uniformly along path P1.

Figure 3:
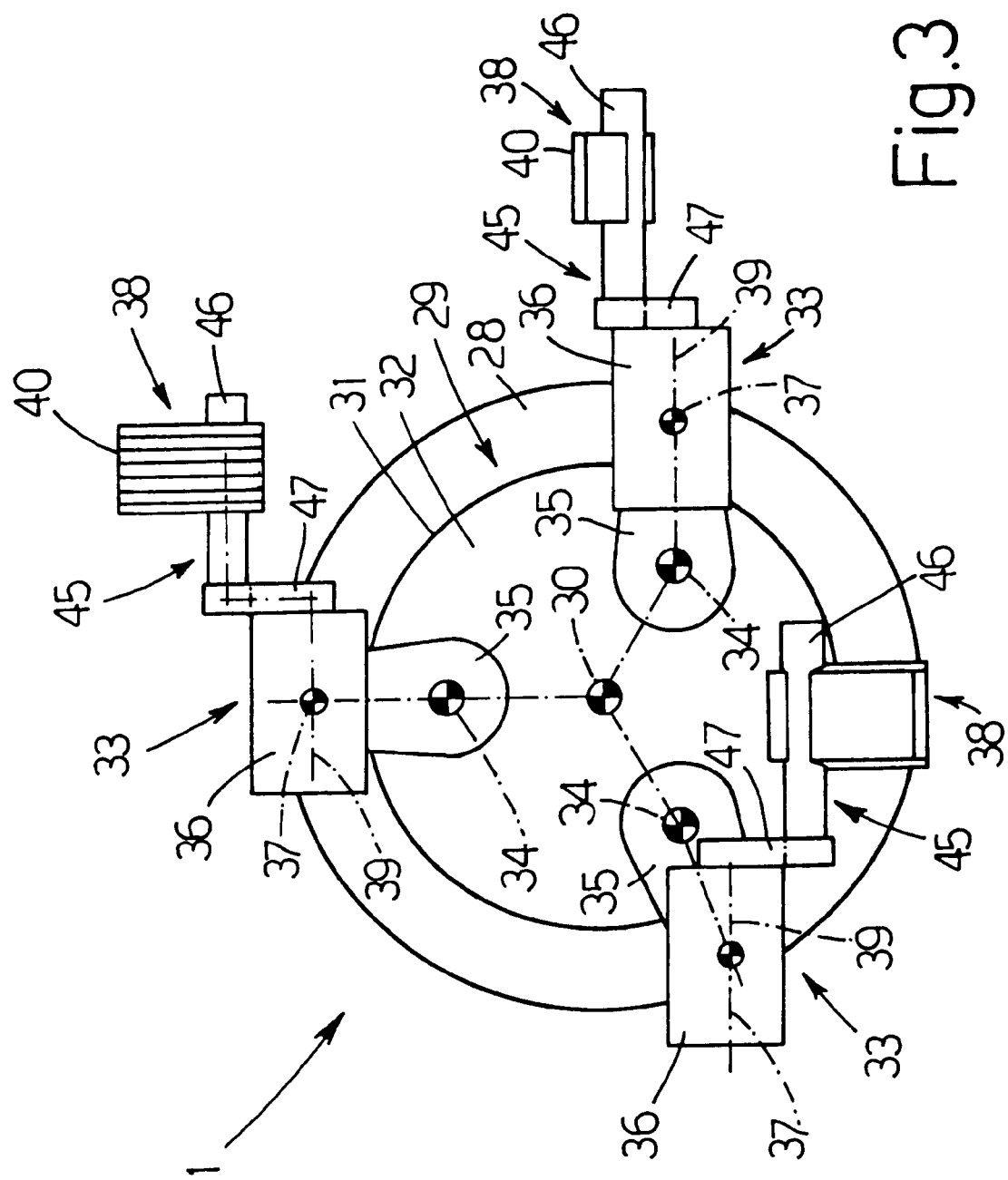
FIG. 3 shows a plan view, with parts removed for clarity, of the FIG. 1 unit.

To transfer cigarettes 2 from seat 21 to seats 27, drum 29 rotates articulated arms 33 clockwise (in FIGS. 1, 3 and 4) about axis 30, while a known mechanism (not shown) inside drum 29 provides for orienting cranks 35 about respective axes 34 according to a law of motion LM1, which is a function of the angular position of respective axes 34 with respect to axis 30, and which provides for positioning axes 37 along a path P3. Path P3 lies in a given plane A, and comprises a curved closed-loop portion 48, and a straight back-and-forth portion 49 connected at one end to portion 48. Heads 36 are fed along path P3, and are kept parallel to direction D1 by a known epicyclic mechanism (not shown), while a further mechanism—preferably a known cam mechanism (not shown) inside heads 36, cranks 35 and drum 29—provides for rotating respective members 38 clockwise (in FIG. 5) about respective axes 39 according to a law of motion LM2, which is a function of the angular position of respective axes 34 about axis 30, and which provides for positioning the grooved face 41 of plate 40 of each pickup member 38 substantially coplanar with supporting surface 12 of plate 10 in a plane B as head 36 travels along straight portion 49 towards outlet 3. As pickup member 38 travels along path P2, along a straight portion 50 coincident with direction D1 and lying in plane B, pusher 18 is then moved forward to push a layer 13 of cigarettes towards seats 42 of pickup member 38. On reaching the end of straight portion 50, pickup member 38 substantially defines an extension of plate 10 and occupies the bottom portion 16 of opening 14, and pusher 18 feeds cigarettes 2 of layer 13 into respective seats 42 of pickup member 38. As suction holes 43 of seats 42 are activated, pickup member 38 is withdrawn from plate 10 by respective head 36 traveling backwards along straight portion 49 of path P3, and by member 38 itself simultaneously rotating about respective axis 39 to lower face 41 with respect to plane B.

Pickup member 38 is then fed, together with respective layer 13 of cigarettes, along a portion 51, along which, pickup member 38 is transferred from outlet 3 towards conveyor 4 by being rotated about axis 30 by drum 29, is maintained in parallel planes perpendicular to path P1 by being rotated equally and in opposite directions about respective axes 34 and 37 by said known mechanisms (not shown), and is turned over through 180° with respect to the position along portion 50 by being rotated about axis 39.

Pickup member 38 is then fed along a curved transfer portion 52 tangent to path P1 at point P, by being rotated, as stated, about axis 30, and is maintained parallel to itself, as stated, by being rotated equally and in opposite directions about respective axes 34 and 37, so that respective grooved face 41 is parallel to bottom wall 25 of seat 27. Along portion 52, each pickup member 38 is timed with a respective seat 27 by the traveling speed component of member 38 parallel to path P1 being maintained equal to the traveling speed of respective seat 27.

Along portion 52, pickup member 38 is moved towards path P1 and is eased inside respective seat 27 until seat 27 reaches point P, by which time face 41 is positioned facing and parallel to bottom wall 25 of seat 27. At this point, the suction through holes 43 is cut off in known manner (not shown) to release layer 13, which is retained by known positioning means (not shown) associated with seat 27, and pickup member 38 is then withdrawn gradually from seat 27.

Transfer portion 52 and straight portion 50 of path P2 are connected by a curved portion 53, along which pickup member 38 is fed, by rotating about axis 30, towards outlet 3, is maintained parallel to itself by being rotated equally and in opposite directions about respective axes 34 and 37, and is rotated 180° about respective axis 39 to position grooved face 41 substantially coincident with plane B to receive the next layer 13 of cigarettes.

Number 54 in the FIG. 6 variation indicates a transfer device for transferring layers 13 of cigarettes 2 from nine outlets 3 of an input hopper T of a transfer unit U to conveyor 4, to form groups 55 of cigarettes, each comprising three superimposed layers 13a, 13b, 13c of cigarettes. Outlets 3 are equally spaced, with a spacing Px, parallel to path P1 of conveyor 4, and are divided into three groups 56, 57, 58 of three outlets 3 each. Group 56 comprises three adjacent outlets 3a, each of which comprises seven channels 9, has a respective plate 10 in a transfer plane B1, and defines a respective seat 21a; group 57 comprises three adjacent outlets 3b, each of which comprises six channels 9, has a respective plate 10 in a transfer plane B2 parallel to and lower than plane B1, and defines a respective seat 21b; and group 58 comprises three adjacent outlets 3c, each of which comprises seven channels 9, has a respective plate 10 in a transfer plane B3 parallel to and lower than plane B2, and defines a respective seat 21c.

Transfer device 54 comprises a platform 59 fitted with a drum 60, which rotates, with respect to platform 59, about an axis 61 perpendicular to plane B3, and is located below plane B3. Device 54 also comprises a platform 62 fitted with a drum 63, which rotates, with respect to platform 62, about an axis 64 parallel to axis 61, and is located above plane B1.

Being identical with each other and with drum 29, the component parts of drums 60 and 63 are indicated using the same reference numbers as for the corresponding parts of drum 29.

Drums 60 and 63 are rotated about respective axes 61 and 64 at the same speed and in the same direction (clockwise in FIG. 6) so that, at each instant, the angular position, about axis 61, of each head 36 on drum 60 is the same as the angular position, about axis 64 and at the same instant, of a corresponding head 36 on drum 63. The two cranks 45 of each pair of corresponding heads 36 have portions 46 in common, and the two common portions 46 define a rod 65, along which are equally spaced, with a spacing Px, nine pickup members 38 having respective plates 40 connected to rod 65 by respective supports 66. Pickup members 38 are divided into three groups 67, 68, 69, each comprising three members 38. More specifically, group 67 comprises three members 38a, the faces 41 of which are coplanar with one another and cooperate with seats 21a along plane B1; group 68 comprises three members 38b, the faces 41 of which are coplanar with one another and cooperate with seats 21b along plane B2; and group 69 comprises three members 38c, the faces 41 of which are coplanar with one another and cooperate with seats 21c along plane B3. Members 38a, 38b, 38c have respective plates 40 for receiving respective layers 13a, 13b, 13c respectively containing seven, six, and seven cigarettes 2.

In actual use, device 54 positions pickup members 38a, 38b, 38c at respective seats 21a, 21b, 21c, simultaneously picks up nine layers 13a, 13b, 13c from seats 21a, 21b, 21c as described with reference to the first embodiment, and feeds pickup members 38a, 38b, 38c and respective groups 67, 68, 69 along respective paths (not shown) substantially identical to path P2 and substantially tangent to path P1 at respective points Pa, Pb, Pc, to transfer each layer 13a, 13b, 13c into a respective seat 27.

Seats 27 travel a distance equal to two spaces Ps in the interval between the passage of successive pickup members 38a, 38b, 38c through points of tangency Pa, Pb, Pc, so that three empty seats 27 are positioned corresponding to three pickup members 38a to receive three layers 13a, the three seats 27 containing respective layers 13a of cigarettes are positioned corresponding to pickup members 38b to receive three layers 13b on top of layers 13a, and the three seats 27 containing layers 13a and 13b are positioned corresponding to members 38c to receive respective layers 13c on top of layers 13b and so simultaneously complete three groups 55 of cigarettes.

Besides positioning pickup members 38a, 38b, 38c to receive cigarettes 2 at respective seats 21a, 21b, 21c and release cigarettes 2 at seats 27 of conveyor 4, the rotation of rods 65 about respective axes 39 also provides for preventing interference between the three rods 65 connecting arms 35 of respective drums 60 and 63.

With reference to the FIG. 7 variation, U indicates a transfer unit comprising a transfer device 70 located between a step-operated conveyor 71 and a continuously-moving conveyor 72, to transfer packets 73 of cigarettes from conveyor 72 to conveyor 71.

Conveyor 71 comprises a belt 74 looped about two known pulleys (not shown), and a number of pockets 75 equally spaced along belt 74. Each pocket 75 comprises a back wall 76; and two lateral walls 77, each having a central slot 78. Walls 76 and 77 of pocket 75 thus define a receiving space or seat 79 for a respective packet 73, which may be fed into seat 79 in a number of input directions through the openings in pocket 75; one of which input directions—that perpendicular to back wall 76 of pocket 75—is indicated D3 in FIG. 7.

Conveyor 72 comprises a belt 80 looped about two pulleys 81; and a number of pockets 82 (only one shown in FIG. 7) spaced along belt 80. Each pocket 82 comprises two lateral walls 83; and a bottom wall 84 having a through opening 85. Walls 83 and 84 of pocket 82 thus define a receiving space or seat 86 for receiving a packet 73, which may be extracted from seat 86 in a number of output directions through the openings in pocket 82; of which output directions, FIG. 7 indicates an output direction D4 parallel to lateral walls 83 and bottom wall 84 of seat 86.

Transfer device 70 comprises a platform 87, and a drum 88, which rotates, clockwise in FIG. 7 and with respect to platform 87, about a respective axis 89. Being similar to drum 29, the component parts of drum 88 are indicated using the same reference numbers as for the corresponding parts of drum 29, whereas the pickup members are designated by numbers 90.

In FIG. 7, drum 88 is equipped with two articulated arms 33 supporting respective pickup members 90 movable along a path P4; one pickup member 90 is shown inside a seat 79 in the process of picking up a respective packet 73; and the other is shown inside a seat 86 in the process of releasing a respective packet 73.

Each pickup member 90 comprises a fixed jaw 91; and a movable jaw 92, which rotates about an axis 93 parallel to axis 39, and is movable, with respect to fixed jaw 91, between a closed position, as shown by the continuous line in FIG. 8, and an open position, as shown by the dash line in FIG. 8. Pickup member 90 also comprises an input/output end 90h for packets 73.

In a number of actual use, conveyor 71 is operated stepwise in steps, each step equal to the spacing of seats 79, to position an empty seat 79 as shown in FIG. 7 at each step, and to feed the seats along a path P5; whereas conveyor 72 is operated continuously to feed packets 73 successively along a path P6 to the transfer device.

Transfer device 70 provides for picking up packets 73 from seats 86 on conveyor 72, and transferring packets 73, one by one, into respective seats 79. Drum 88 is rotated clockwise in FIG. 7, and cranks 35 are oriented according to law of motion LM1 as a function of the angular position of axes 34 about axis 89, to position respective heads 36 along path P3. Each pickup member 90 is rotated about respective axis 39 and with respect to respective head 36 according to a given law of motion LM3, which is a function of the angular position of respective axis 34 about axis 89, and which provides for cyclically rotating pickup member 90 through 90°, and, together with the movements of arms 33 described previously, for also feeding pickup member 90 along path P4. Path P4 (FIG. 7) comprises a curved transfer portion 94 lying in a given plane R and tangent to path P6 at a point Pr; a straight transfer portion 95 lying in a plane S parallel to plane R; and two curved portions 96, 97 connecting portions 94 and 95 on opposite sides.

Along portion 94, pickup member 90 positions jaws 91 and 92 opposite a respective seat 86, and travels along portion 94 with a speed component, parallel to path P6, equal to the traveling speed of seat 86. Along portion 94, pickup member 90, by means of known actuators (not shown), keeps movable jaw 92 in the open position, and gradually inserts fixed jaw 91 inside through opening 85 beneath packet 73, up to point of tangency Pr.

The instant pickup member 90 reaches point of tangency Pr, known actuators (not shown) set movable jaw 92 to the closed position to grip packet 73 inside seat 86. Packet 73 is then gradually withdrawn from seat 86 in direction D4 by pickup member 90, which, by virtue of the movements of respective arm 33 described with reference to the previous embodiments, is kept at, and equioriented with respect to, seat 86.

Along portion 96, pickup member 90, together with packet 73, is rotated 90° about axis 39 and positioned, together with packet 73, along plane S containing straight portion 95 oriented in direction D3. Pickup member 90, together with packet 73, is then fed in direction D3 along portion 95 towards back wall 76 of pocket 75 to gradually insert packet 73 inside seat 79. At the same time, movable jaw 92—which, in the closed position, engages slot 78 in the bottom lateral wall 77 of seat 79—is opened to release packet 73. Once packet 73 is inserted, pickup member 90 is withdrawn from back wall 76 along portion 95 to disengage movable jaw 92 from seat 79 and so as not to interfere with the released packet 73. Along portion 97 of path P4, the pickup member is rotated 90° and positioned in plane R in time with a seat 86 on continuous conveyor 72 to pick up the next packet 73.

FIGS. 9 and 10 show a device 98 for retaining cigarettes inside pockets 24 of conveyor 4, and which comprises a conveyor 99 in turn comprising an endless belt 100 (not shown in FIG. 9), having a branch 101 parallel to path P1 at the region in which layers 13a, 13b and 13c are transferred to pockets 24.

Conveyor 99 comprises a number of retaining elements 102 spaced along belt 100 with spacing Px, i.e. the spacing of pockets 24 and members 38.

Each retaining element 102 comprises a carriage 103 drawn by belt 100 and engaging known guides (not shown); and a gripper 104, which is movable with respect to carriage 103 and is connected to carriage 103 about an axis 105 perpendicular to the FIG. 10 plane. Each gripper 104, comprises an end finger 106 for selectively engaging seat 27 of pocket 24, and supports a shaft 107 extending perpendicular to axis 105. Shaft 107 supports a roller 108 located between finger 106 and axis 105, and a projecting roller 109 located at axis 105. That is, rollers 108 and 109 are located on opposite sides of axis 105. Each retaining element 102 also comprises a spring 110, which is connected to carriage 103 and to gripper 104, and exerts a closing force between gripper 104 and carriage 103 to push finger 106 towards bottom wall 25 of respective pocket 24.

Conveyor 99 comprises three adjacent cams 111, 112, 113 extending parallel to path P1 at the region in which layers 13a, 13b, 13c are transferred to pockets 24, and which cooperate with rollers 108 and provide for raising grippers 104. At the region in which belt 100 extends about a respective pulley (not shown), cams 111, 112, 113 join to form a single cam profile 114. Conveyor 99 also comprises a further cam 115 which cooperates with roller 109.

Device 98 also comprises a conveyor 116, in turn comprising an endless belt 117 having a bottom branch 118 parallel to and over path P1 to retain the complete groups 55.

In actual use, device 98 feeds the conveyor 99 forward with retaining elements 102 in time with respective pockets 24 of conveyor 4, so that, at the region in which layers 13a, 13b, 13c are transferred, each pocket 24 faces and is paired with a respective retaining element 102. The respective rollers 108 of three successive adjacent retaining elements 102 are offset (as shown in FIG. 10 in which the rollers 108 of two successive elements are shown by the dash lines) so that each roller 108 engages a cam 111, 112, 113 other than the cam 111, 112, 113 engaged by the other rollers 108. This, together with given profiles of cams 111, 112, 113, provides for simultaneously lifting three successive adjacent grippers 104 by equal amounts, and so enabling insertion of member 38 and a respective layer 13a, 13b, 13c inside pocket 24. When a layer 13a, 13b, 13c is inserted inside pocket 24, grippers 104 are lowered by spring 110, and respective fingers 106 are maintained at a given level by cam 115, which determines the level according to the layer 13a, 13b, 13c that has been inserted. That is, as the points Pa, Pb, Pc along path P1 at which respective layers 13a, 13b, 13c are inserted are known and predetermined, cam 115 determines different levels as a function of the position of elements 102 along path P1.

Conveyor 116 provides for maintaining groups 55 inside respective pockets 24 by positioning bottom branch 118 over pockets 24 and contacting layer 13c of group 55 along the portion of path P1 in which groups 55 are complete and ready for transfer to a known wrapping wheel (not shown).

At this stage, fingers 106 are raised to release group 55 by profile 114; and elements 102 are fed back along the return branch to the transfer region of layers 13a, 13b, 13c to repeat the above cycle.

What is claimed is:

1. A method of transferring articles from a first location to a second location, said method comprising:
    providing a first seat at one of said locations in which the articles can be introduced and removed in a given first direction,
    providing a second seat at the other said locations in which the articles are to be transferred,
    advancing one of said seats along a first path spaced from the other of said seats and with relative movement with respect thereto,
    engaging the articles in said first seat by a pickup member,
    conveying the articles by said pickup member along a path from said first seat to the second seat,
    operating said pickup member so that the pickup member travels continuously along its said path which includes a first portion tangent to said first path of said one seat and a second portion which is straight and extends parallel to said first direction in which said articles can be introduced and removed from said first seat,
    said articles being engaged by said pickup member while traveling along one of said portions of said path and being transported by said pickup member along its said path and introduced into said second seat by said pickup member at the other of said portions of said path.

2. The method as claimed in claim 1, wherein said second seat travels along said first path at a given speed and said pickup member travels at the same speed as said second seat when tangent to said first path and said articles are introduced into said second seat by said pickup member.

3. The method as claimed in claim 1, comprising engaging said pickup member in said second seat when introducing said articles into said second seat.

4. The method as claimed in claim 1, comprising forming said path of said pickup member as a closed path along which said pickup member travels continuously.

5. The method as claimed in claim 1, wherein said pickup member is conveyed along said path thereof such that one end of said pickup member faces said first seat when engaging said articles in said first seat and said one end of the pickup member faces said second seat when the articles are introduced into said second seat.

6. The method as claimed in claim 5, wherein said first path is straight and extends crosswise to said first direction.

7. The method as claimed in claim 1, comprising turning said articles as said articles are conveyed by said pickup member from said first seat to said second seat.

8. The method as claimed in claim 1, wherein said second seat travels along said first path, said articles being engaged by said pickup member at said second portion of the path of said pickup member while discharging said articles from said first seat in said first direction.

9. The method as claimed in claim 8, comprising discharging said articles from said first seat periodically in correspondence with travel of said pickup member to said second portion of its path of travel.

10. The method as claimed in claim 1, wherein said first seat travels along said first path, said articles being engaged by said pickup member at said first portion of said path of said pickup member while said pickup member is tangent to said first path.

11. The method as claimed in claim 10, wherein said pickup member conveys said articles from said first seat to said second seat and deposits the articles in said second seat while traveling along said second portion of its said path, said second seat advancing stepwise in correspondence with said pickup member as it periodically travels to said second portion of its path.

12. Apparatus for transferring articles from a first location to a second location comprising:
    a first seat at one of said locations at which articles can be introduced and removed in a first direction,
    a second seat at the other of said locations at which the articles are to be transferred,
    means for conveying one of said seats along a straight first path spaced from the other of said seats,
    a pickup member continuously driven along a path of travel from said first seat to said second seat and back to transfer said articles from said first seat to said second seat, said path of travel of said pickup member including a first portion tangent to said first path of said one of said seats, and a second portion which is straight and extends parallel to said first direction in which the articles can be introduced and removed from said first seat, and actuating means driving said pickup member continuously along its said path to engage said articles in said first seat while said pickup member travels along one of said portions of its said path and transports said articles to said second seat while traveling along the other of said portions of its path, said pickup member being driven by said actuating means parallel and in time with said one seat as said one seat travels along said first path.

13. Apparatus as claimed in claim 12, wherein said second seat travels along said first path at a given speed, said actuating means driving said pickup member at the same speed as said second seat when tangent to said first path and while said articles are transferred from said pickup member into said second seat.

14. Apparatus as claimed in claim 13, wherein said pickup member is driven by said actuating means to engage in said second seat when the articles are being transferred to said second seat.

15. Apparatus as claimed in claim 12, wherein said path of the pickup member is a closed path.

16. Apparatus as claimed in claim 12, wherein said pickup member has one end which is kept by said actuating means in a direction parallel to said first direction in which the articles can be introduced and removed from said first seat.

17. Apparatus as claimed in claim 16, wherein said first path is straight and extends crosswise to said first direction.

18. Apparatus as claimed in claim 12, wherein said actuating means drives said pickup member to turn said articles as said pickup member moves from said first portion of its said path of travel to its said second portion of said path of travel.

19. Apparatus as claimed in claim 12, wherein said second seat travels along said first path, said pickup member engaging said articles at said second portion of the path of travel of said pickup member as said articles are removed from said first seat in said first direction.

20. Apparatus as claimed in claim 19, wherein said articles are periodically removed from said first seat in correspondence with travel of said pickup member to said second portion of its said path of travel.

21. Apparatus as claimed in claim 12, wherein said first seat travels along said straight first path, said pickup member engaging said articles in said first seat while said pickup member is in said first portion of its said path of travel and is tangent to said straight first path of said first seat.

22. Apparatus as claimed in claim 21, wherein said second seat is advanced stepwise and said first seat is advanced continuously along said straight first path, said pickup member being driven by said actuating means to remove said articles from said second seat while traveling continuously along said first portion of its said path of travel and introduce said articles into said first seat while said first seat is at rest between successive stepwise advances.

23. Apparatus as claimed in claim 12, wherein said actuating means comprises a drum rotatable about a first axis crosswise to said straight first direction and an articulated arm connected to said drum and supporting said pickup member.

24. Apparatus as claimed in claim 23, wherein said articulated arm includes a first crank connected to said drum for rotation about a respective second axis parallel to said first axis, and a head mounted on said first crank for rotatable movement about a third axis parallel to said first axis, said pickup member being connected to said head.

25. Apparatus as claimed in claim 24, wherein said articulated arm further includes a second crank supported on said head for rotation about a fourth axis crosswise to said first axis, said pickup member being mounted on said second crank.

26. Apparatus as claimed in claim 12, wherein said first seat is one of a plurality of first seats which are equally spaced and aligned in parallel with said straight first direction.

27. Apparatus as claimed in claim 23, wherein said actuating means further comprises a second drum adjacent to the first said drum and rotatable about an axis parallel to said first axis in the same direction and at the same speed as said first drum, said second drum supporting a respective said articulated arm, both said articulated arms traveling in synchronization with one another, and means connected to the articulated arms of both said drums and supporting a plurality of pickup members equal in number to the plurality of said first seats.

28. Apparatus as claimed in claim 12, wherein said articles are cigarettes and said pickup member comprises plate having a face with means for retaining a layer of said cigarettes thereon.

29. Apparatus as claimed in claim 12, wherein said pickup member comprises a fixed jaw and a movable jaw for selectively gripping and releasing a respective said article.

* * * * *